United States Patent [19]

Staggers

[11] Patent Number: 5,722,330
[45] Date of Patent: Mar. 3, 1998

[54] PALLET SYSTEM

[75] Inventor: Barry Staggers, Aylesbury, United Kingdom

[73] Assignee: Xerox Corporation, Stamford, Conn.

[21] Appl. No.: 784,872

[22] Filed: Jan. 16, 1997

[30] Foreign Application Priority Data

Jan. 19, 1996 [GB] United Kingdom ............ 9601107

[51] Int. Cl.⁶ ..................................... B65D 19/44
[52] U.S. Cl. ............................................ 108/55.3
[58] Field of Search ........................ 108/55.3, 55.1, 108/53.1, 54.1, 51.1

[56] References Cited

U.S. PATENT DOCUMENTS

| | | | |
|---|---|---|---|
| 4,015,710 | 4/1977 | Biggs. | |
| 4,042,107 | 8/1977 | Kendig | 108/55.3 X |
| 4,062,301 | 12/1977 | Pitchford | 108/54.1 X |
| 4,295,431 | 10/1981 | Stavlo | 108/55.1 |
| 4,694,962 | 9/1987 | Taub | 108/54.1 X |
| 4,735,310 | 4/1988 | Lemery et al. . | |
| 4,977,836 | 12/1990 | Bond | 108/55.1 |
| 5,257,896 | 11/1993 | Hastings | 108/55.1 X |
| 5,297,485 | 3/1994 | Bond | 108/55.1 |
| 5,497,708 | 3/1996 | Jeruzal | 108/55.3 X |
| 5,609,111 | 3/1997 | Hasegawa et al. | 108/55.1 |

FOREIGN PATENT DOCUMENTS 184028  11/1982  Japan ............................. 108/55.3

*Primary Examiner*—Jose V. Chen
*Attorney, Agent, or Firm*—Robert A. Chittum

[57] ABSTRACT

A pallet system for transporting an item, such as a copier or printer, is described. The system comprises a base with feet and upstanding corner pieces which engage around the feet of an identical base to enable the stacking of pallet systems that are not in use. The item or copier to be secured to the base is retained between a fixed rear support member and an adjustable front support member. Location points are provided on each of the support members for engaging a locating member attached to the copier. The position of the front support member is adjustable by means of a scissor jack which is secured by a jack base to a point near the front of the base of the pallet system. The scissor jack is operated by rotating its operating knob, which includes a torque limiter to limit the torque applied to the copier, thereby enabling the copier to be firmly secured on the pallet without damaging it.

15 Claims, 5 Drawing Sheets

5,722,330

PALLET SYSTEM

BACKGROUND OF THE INVENTION

This invention relates to a pallet and a pallet system for transporting an item such as a piece of machinery, and is particularly, although not exclusively, useful for transporting a xerographic copier or printer.

A floor-standing copier is typically of such weight and size that the only practical way of transporting it is to use a pallet. Pallets, usually of metal or wood, are commonly used to transport items such as copiers, or domestic appliances, from the factory to the workplace, or to a store, or to a home. In general, the pallet is sufficiently strong and rigid that it can be lifted, together with the machine, by a hand-operated lifting trolley, or by a fork-lift truck. To this end, known pallets have a generally flat base on which the machine stands, and legs or feet which stand on the ground, with spaces below the flat base into which the forks of the lifting trolley or fork-lift truck can engage.

Known pallets suffer from a number of disadvantages. For example, wooden pallets can relatively easily be damaged or broken. Furthermore, each type of machine to be transported will generally need a unique pallet for its transportation. Thus, in the common situation where a new machine is replacing an old one, it is often necessary to deliver the new machine on its own pallet, and to remove the old machine on its, different, pallet. This requirement for two different pallets complicates, and increases the cost of, the delivery and removal operation.

GB-A-0 773 948 discloses an improved rack which comprises a platform onto which items can be clamped. The platform includes clamping means arranged therein which can be folded up to a vertical position when required so that a clamping member positioned to extend across a load to be retained on the platform can be engaged by the clamping means. The clamping means are fixed in location with respect to the platform and rely on the clamping member to transfer the securing force to the load. Means are also disclosed for stacking the racks on one another.

U.S. Pat. No. 5,297,485 describes an adjustable pallet in which four support members can be moved relative to the platform of the pallet to engage sides of the load to be carried on the pallet. All four of the support members are slidable within tracks formed on the upper surface of the pallet and are lockable in the required position.

GB-A-1 415 784 discloses a pallet which comprises a platform in which a plurality of pairs of flap members are located, the flap members being mounted for pivotal movement about an edge so that they can be deployed out of the plane of the platform to support cylindrical objects for transportation. The flap members can be deployed mechanically or hydraulically.

EP-A-0 309 444 describes a pallet on which a plurality of identical objects can be retained. The pallet comprises a base and pairs of opposing side walls which have shaped recesses for engaging the objects. Adjustment between the side walls is achieved by a screw thread arrangement.

It is an object of the present invention to overcome these disadvantages.

SUMMARY OF THE INVENTION

According to the present invention, there is provided a pallet system for transporting an item, the system comprising:

a pallet including a base, a first support member fixed securely to the base, and a second support member mounted on the base and spaced from the first support member to accommodate the item therebetween, the second support member being manually adjustable relative to the base for providing a releasable engagement with the item to secure it to the base;

locating means attachable to the item, the first support member and the second support member each including a plurality of location points, the locating means being carried by the item engaging respective location points provided in the first and second support members, in accordance with its size, to effect the releasable engagement.

The invention also provides one or more extension members adapted to be secured to the pallet, for enabling the pallet system to accommodate larger items than said pallet alone.

The pallet of the invention has the advantage that a single design of pallet may accommodate a significant number of different machines, for example all the copiers or printers currently in use and under current manufacture by a given manufacturer or group of manufacturers. This enables a supplier to have a stack of only one kind of pallet, and to use only a single pallet to both deliver the new machine and collect the old one.

Moreover, the pallet system in accordance with the present invention allows rapid accommodation and securing of any copier or printer thereto once that copier or printer has then locating means attached thereto.

BRIEF DESCRIPTION OF THE DRAWINGS

A pallet, and a pallet system including the pallet, in accordance with the invention, will now be described by way of example with reference to the accompanying drawings, in which.

DETAILED DESCRIPTION OF THE INVENTION

Figure 1:
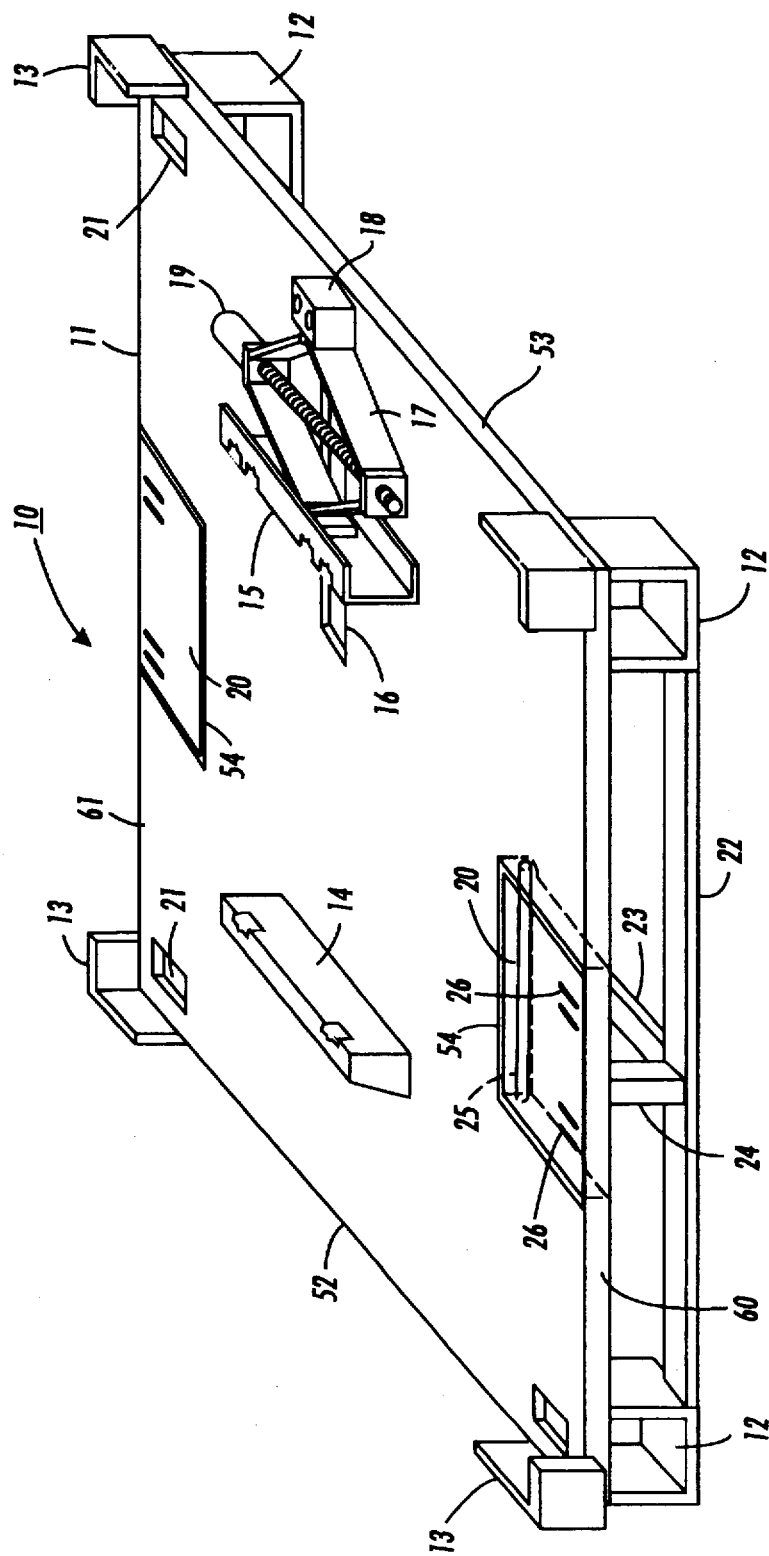
FIG. 1 is an isometric view of the pallet.
Figure 2:
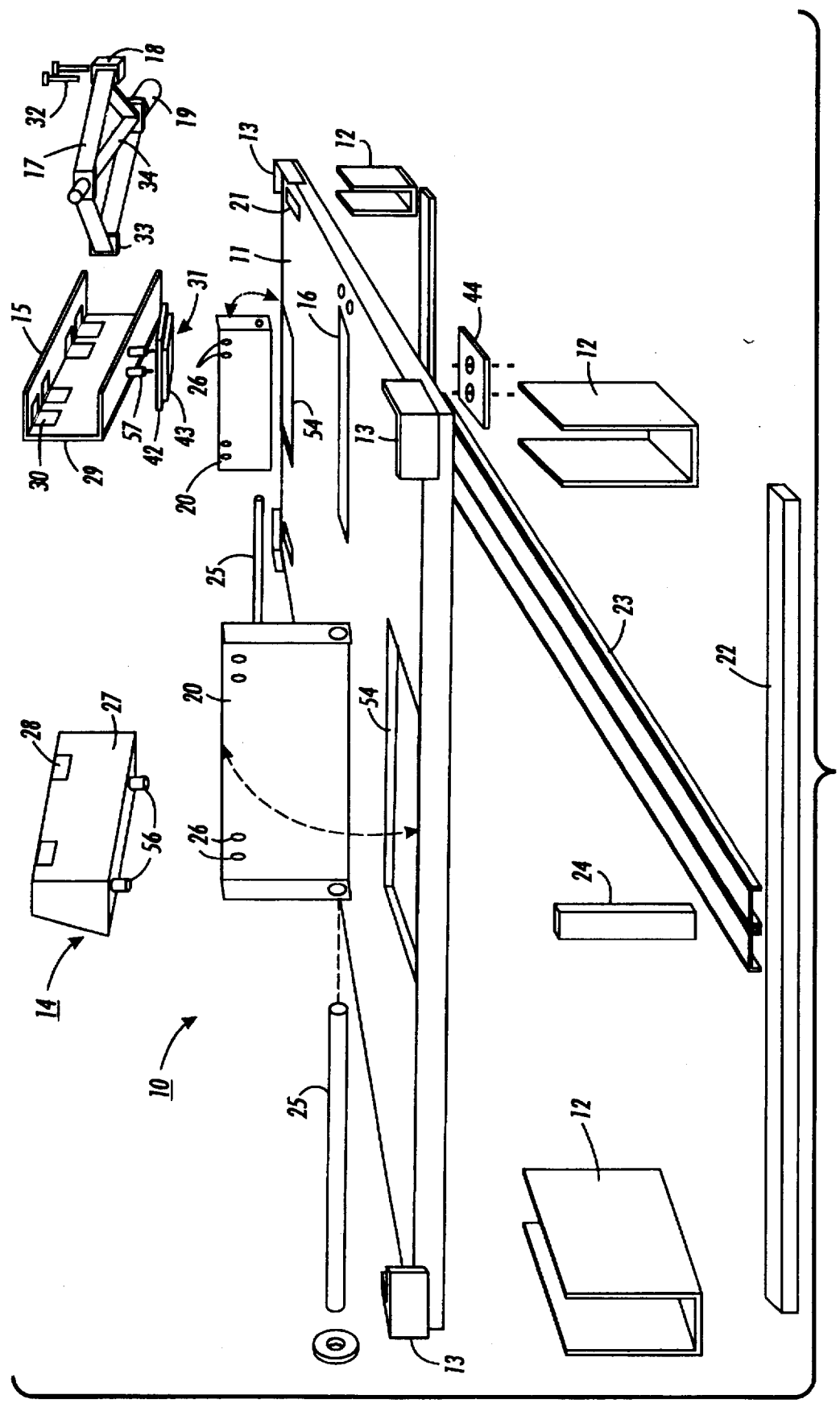
FIG. 2 is an exploded, diagrammatic view of the pallet.
Figure 3:
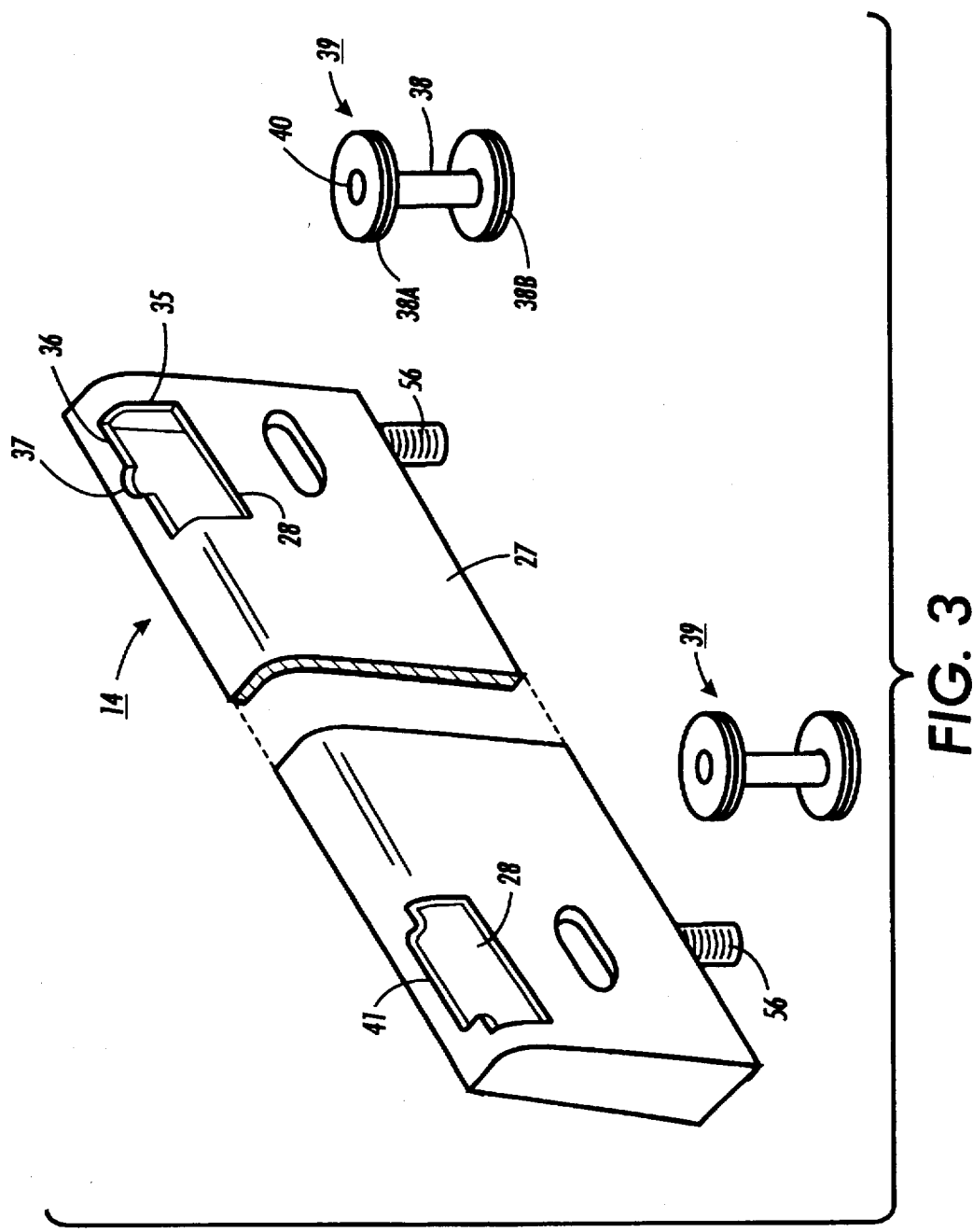
FIG. 3 is an isometric view of a rear support member of the pallet.

Referring to FIGS. 1 to 3, the pallet 10 consists principally of a generally rectangular base 11 and four supporting feet 12. The base 11 and feet 12 are of a strong, rigid material such as pressed steel and may be secured together by welding. The edges of the base are bent down and then under the base, to form square U-shaped edge sections, to add rigidity and strength to the base. On each corner, upstanding corner pieces 13 are provided, spaced to accommodate the feet of another, identical, pallet, thereby enabling stacking of pallets that are not in use.

Towards the rear edge 52 of the base 11 is secured a rear support 14, which is adapted to engage the rear of an item such as a copier, as will be further described below. Towards the front edge 53 of the base 11 is mounted an adjustable front support 15 which is slidable rearwardly and forwardly in a slot 16 and which is mounted on, and adjusted by, a scissor jack 17. The jack 17, which is arranged to expand in a horizontal direction or parallel to the base 11, is secured by its base 18 to a point close to the front edge of the pallet. On operating the jack 17, by means of a rotatable operating knob 19, the front support 15 may be moved in a direction towards the rear edge of the pallet to engage the front of a copier, thereby securing the copier on the pallet between the front support 15 and the rear support 14.

On the base 11 are pivotally mounted flaps 20 located next to the sides 60, 61 of the pallet hinged about their inboard edges 54. These flaps 20 may be lifted to provide brackets, which form an alternative means of securing different sizes of copiers on the pallet. The flaps 20 are normally stowed in the plane of the base, and are conveniently a snap-fit into their stowed positions.

In the four corners of the base 11, rectangular apertures 21 are provided to accommodate the feet of a frame (not shown) which surrounds a copier secured to the pallet, and enables a second pallet, carrying another copier, to be positioned on top of the first pallet. This arrangement enables twice as many copiers to be transported for a given floor area.

Referring now more particularly to FIG. 2, the construction of the pallet 10 is shown in more detail The feet 12 are U-shaped members which are welded to the underside of the base 11, with additional strength provided by side bars 22 welded to the feet 12. A cross-bar 23 extends between the two side bars 22, and vertical struts 24 are secured between the side bars 22, adjacent the ends of the cross-bar 23, and the underside of the base 11. The flaps 20 are hinged, by means of rods 25, on brackets (not shown) extending just below the surface of base 11. Holes 26 in the flaps 20 enable bolts or other fixings to secure one type of a copier to the pallet. The bolts or other fixings are arranged to engage suitable anchor points within the copier, typically after removing part of the outer casing of the copier.

Rear support 14, which may be bolted to the base 11 for example, by threaded studs 56, presents a substantially vertical face 27 towards the front of the pallet, with cut-outs 28 to accommodate locating members mounted within the copier, as will be described below with reference to FIG. 3. Front support 15 similarly presents a substantially vertical face 29 towards the rear of the pallet, with cut-outs 30 as will be further described below with reference to FIG. 4. The front support 15 is arranged for sliding movement over the base 11, in a front-to-rear direction, by means of a spacer member 31 having an upper, wider portion 42 and a lower, narrower portion 43 which engages in the slot 16 in base 11. The lower, narrower portion of spacer member 31 is slightly thicker than the thickness of base 11, to enable sliding within the slot. The spacer member 31 may be bolted to the underside of front support 15 by bolts 57 or the like. The base 18 of jack 17 is secured by bolts 32 (FIG. 2) to the base 11 near its front edge, with the jack 17 arranged to expand in a horizontal direction on turning its operating knob 19. The apex 33 of the jack opposite its base 18 is secured to the front support 15, so that on operation of the jack 17 to expand it, the front support 15 moves rearwardly. Conversely, on operation of the jack to contract it, the front support 15 moves towards the front of the pallet. The scissors jack 17 is of conventional construction, having a threaded rod 34 which is turned by the operating knob 19, and which engages in a threaded aperture in the frame of the jack to cause it to expand or contract. Incorporated in the operating knob 19, however, is a torque limiter. This ensures that only a predetermined torque, for example from 2 to 3 Nm, can be applied via the front support 15, to the copier. This enables the correct force to be applied to the copier, this force being sufficient to firmly secure the copier without distorting or damaging its frame. It is found that the operating knob can be operated manually, i.e. without the use of additional tools, to enable rapid loading and unloading of the pallet.

Figure 4:
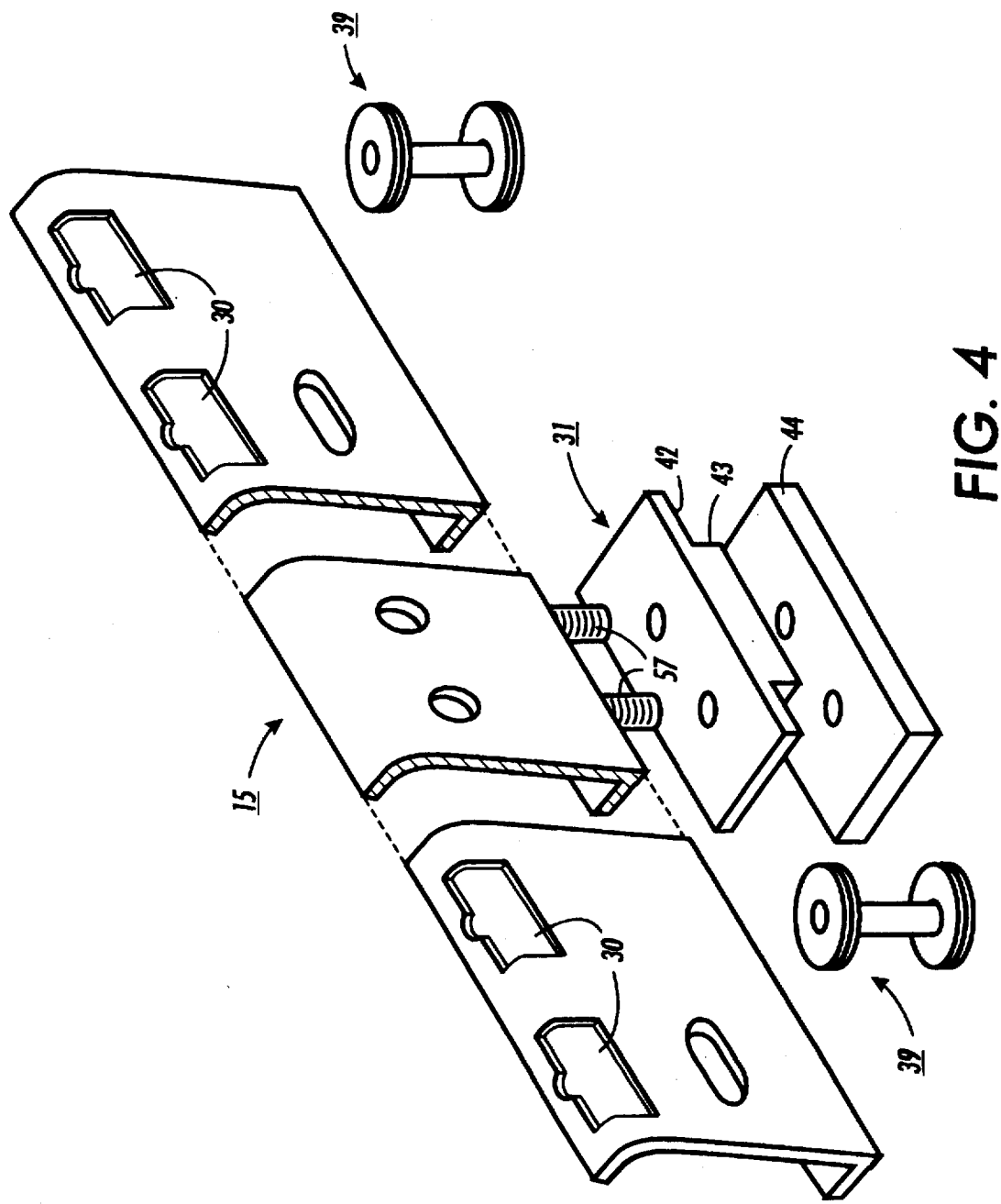
FIG. 4 is an isometric view of a front support member of the pallet.

In order to locate the copier on the pallet, the front and rear supports 15 and 14 use a locating arrangement as shown in FIGS. 3 and 4. In FIG. 3, the cut-outs 28 are shown in detail, and comprise a generally vertical, rectangular aperture portion 35, and a generally horizontal aperture portion 36. The generally horizontal aperture portion 36 incorporates a semi-circular recess 37 which is of a size such as to accommodate vertical shaft 38 of a locating bobbin 39. Locating bobbins 39 are generally cylindrical and each comprises a central shaft 38 which carries flanges 38a, 38b. The bobbin 39 is hollow having a central aperture 40 through which the bobbin 39 is bolted to the frame of the copier (not shown). One of the cut-outs 28 in rear support 14 has an extended recess 41 so that different machines may be accommodated. Instead of locating bobbins, some copiers may use other locating means, such as brackets which pass through the cut-out 28 and are bolted to the rear support 14 through the aperture shown just below the cut-out 28. However, it is preferred that locating bobbins be used.

In similar fashion, as shown in FIG. 4, the front support 15 has four cut-outs 30 of the same configuration as the first cut-out 28 described above with reference to FIG. 3. These cut-outs likewise receive locating bobbins 39. The various cut-outs are sized, shaped, and positioned to enable a number of different copiers to be firmly secured to the pallet. Also seen in FIG. 4 is the spacer member 31, with its upper, wider portion 42 and its lower, narrower portion 43. A retaining plate 44 is bored, beneath the base 11, to the underside of the front support 15, with the spacer member 31 between them.

In order to maximise the usefulness of the pallet, an auxiliary kit of bolts or other fixings, and of locating bobbins and brackets of different sizes and shapes, is provided with each pallet. A box (not shown) containing this kit is stored below one of the flaps 20.

Figure 5:
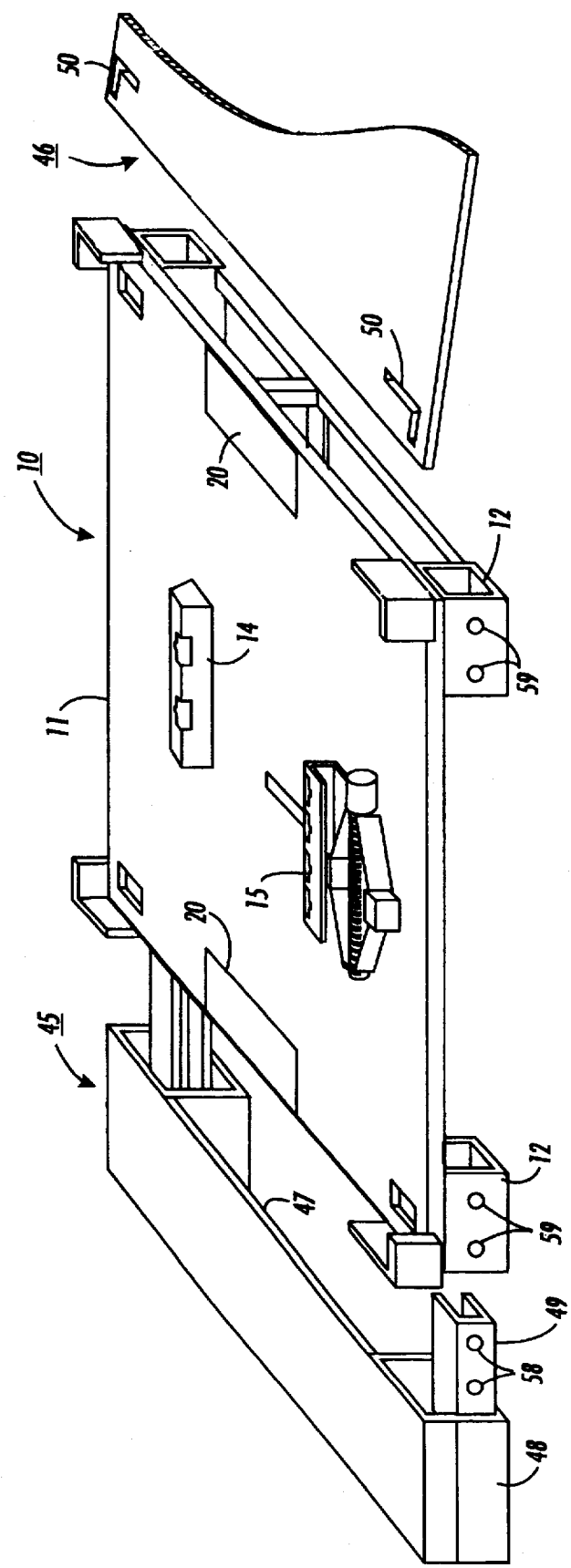
FIG. 5 is an isometric view of a pallet system incorporating the pallet of FIG. 1.

The pallet can form part of a pallet system, as indicated in FIG. 5, in which a pallet 10, as described above, is used in conjunction with one or more pallet extenders 45, and a ramp 46. The pallet extender 45 comprises a base 47, feet 48 like the feet 12 of pallet 10, and securing girders 49. The girders 49 extend from within the feet 48 of the extenders 45, and can be bolted, or otherwise secured to the feet 12 of the pallet 10 by aligning holes 58, 59 in girders and pallet feet, respectively. This enables copiers of larger sizes to be carried than would be possible with the basic pallet 10 only. Pallet extenders of different sizes may be provided, and two extenders may be added, one to each side of the basic pallet.

To facilitate loading of a copier onto the pallet, a ramp 46 is provided, consisting of a simple flat sheet, for example of pressed steel, with shaped apertures 50 which engage over the corner pieces 13 of the pallet 10.

In use of the pallet system, the ramp is put into place, and the copier is wheeled up the ramp and onto the pallet 10. It is manoeuvred into position such that the cut-outs 28 in the rear support 14 engage the locating bobbins 39 which have been fixed in place in the rear of the copier. The operating knob 19 of the jack 17 is then rotated until the cut-outs in the front support 15 engage the locating bobbins secured into the front of the copier. When the torque limiter operates by "clicking" when the pre-set torque has been reached, the copier is correctly secured on the pallet. The forks of a hand trolley or of a fork-lift truck are then inserted under the base 11 of the pallet, and it is lifted up and transported away. To assist the grip of the lifting forks, a roughened, non-slip surface not shown is provided, for example in the form of a self-adhesive strip of emery cloth, on the underside of the base. Unloading of the copier is carried out by undoing the jack 17, manoeuvring the copier out of engagement with the rear support 15 and rolling it down the ramp.

What is claimed is:

1. A pallet system for transporting an item, the system comprising:

a pallet including a base, a first support member fixed securely to the base, a second support member slidably mounted on the base and spaced from the first support member to accommodate the item therebetween, and means for manually adjusting the second support member relative to the base and in a direction toward the first support member for providing a releasable engagement with the item to secure the item to the base, each of the first and second support members include a plurality of cut outs; and a plurality of locating means attachable to the item, the locating means, after attachment to the item, engage respective cut outs provided in the first and second support members, when the manual adjusting means is adjusted to effect the releasable engagement of the first and second support members with the item, thereby securing the item to the pallet.

2. A pallet system according to claim 1, wherein the locating means comprises a plurality of bobbin members, each bobbin member comprising a central shaft having an aperture therethrough, the shaft carrying a flange at opposite ends thereof, each bobbin member being attached to the item through aperture.

3. A pallet system according to claim 2, wherein the manual adjusting means is adjustable by manually rotatable means to apply a force to the item and secure the item between the first and second support members.

4. A pallet system according to claim 3, wherein the manual adjusting means includes a scissor jack mounted to apply a force to the second support member to move said second support member in a generally horizontal direction towards the first support member.

5. A pallet system according to claim 4, wherein the manually rotatable means includes a torque limiter to limit the force applied to the item by the first and second support members.

6. A pallet system according to claim 5, wherein the base of the pallet includes additional pivotally mounted support members for securing different sized items.

7. A pallet system according to claim 6, wherein the base of the pallet includes upstanding corner members arranged to engage an identical pallet system for stacking purposes.

8. A pallet system according to claim 7, further including one or more extension members adapted to be secured to the base of the pallet for enabling the pallet system to accommodate larger items than the pallet alone.

9. A pallet system according to claim 8, further including a ramp adapted to be engaged by the base of the pallet to facilitate loading and unloading of an item onto the pallet.

10. A pallet system according to claim 9, further including a frame adapted to engage with the base of the pallet, the frame being arranged to contain the item on the pallet and to enable the stacking of a pallet system carrying an item on top of another pallet system also carrying an item.

11. A pallet system for transporting an item, the system comprising:

a pallet including a base, a first support member having cut outs therein and being fixedly secured to the base, a second support member having cut outs therein and being adjustably mounted on the base for relative motion therewith, the second support member being spaced from the first support member to accommodate therebetween an item to be transported, and actuating means for adjusting said second support member relative to the base and in directions toward and away from the first support member for releasable engagement of the pallet with the item to be transported; and a plurality of locating members, each locating member having means for attachment to the item to be transported, the locating members, after being attached to the item to be transported, being engagable with the cut outs in the first and second support members, when the actuating means is actuated to adjust the second support member in a direction towards the first support member, thereby releasably securing the item to be transported to the pallet base by the first and second support members and said locating members which are engaged with the cut outs in the first and second support members to prevent removal of the item from the pallet base.

12. A pallet system according to claim 11, wherein the locating members comprise a plurality of bobbin members, each bobbin member comprising a central shaft having an aperture therethrough, the shaft carrying a flange at opposite ends thereof; and wherein the means for attachment of the bobbin members to the item to be transported is the central shaft aperture through which the bobbin member is attached to said item by a bolt.

13. A pallet system according to claim 12, wherein the actuating means is a scissor jack having a threaded rod which is rotated by a manually turnable operating knob to cause the scissor jack to move the second support member and apply a force to the item.

14. A pallet system according to claim 13, wherein the actuating means further comprises a torque limiter to limit the force applied to the item by the first and second support members.

15. A pallet system for transporting an item, the system comprising:

a pallet including a base, a first support member fixed securely to the base, a second support member slidably mounted on the base and spaced from the first support member to accommodate the item therebetween, and a scissor jack fixedly fastened to the base and attached to the second support member, each of the first and second support members having a plurality of location points, the scissor being manually adjustable to move the slidable second support member in a direction towards the first support member to provide a force on the item by said first and second support members; and a plurality of bobbin members attachable to the item, each bobbin member comprising a central shaft having an aperture therethrough and a flange on opposite ends of the central shaft, each bobbin member being attachable to the item through the central shaft aperture, the bobbin members attached to and carried by the item located on the pallet between the first and second support members engaging respective location points provided in the first and second support members, in accordance with the size of the item, to effect the releasable engagement of the bobbins with the location points of the first and second support members concurrently with manual adjustment of the scissor jack to move the second support member toward said first support member, thereby effecting releasable engagement of the item and securement thereof to the pallet.

* * * * *